(No Model.)
B. COLVIN.
Barrel Truck.
No. 229,958.          Patented July 13, 1880.
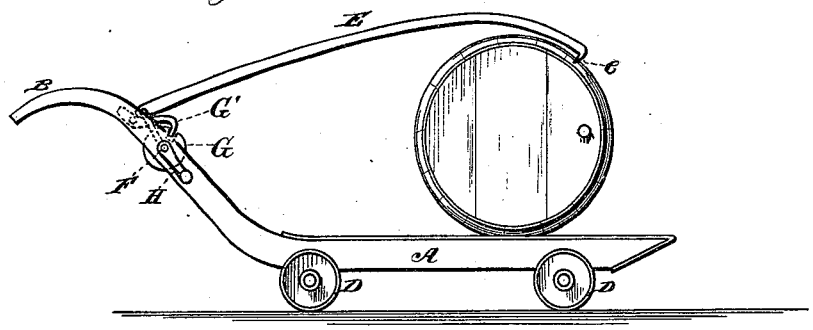
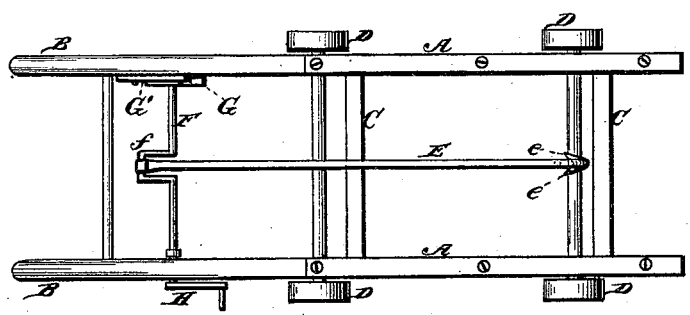
WITNESSES                    INVENTOR
Robert Barrett            Benoni Colvin,
James J. Sheehy          J Clement Smith.
                                      ATTORNEYS

UNITED STATES PATENT OFFICE.

BENONI COLVIN, OF FREEPORT, ILLINOIS.

BARREL-TRUCK.

SPECIFICATION forming part of Letters Patent No. 229,958, dated July 13, 1880.

Application filed June 1, 1880. (No model.)

*To all whom it may concern:*

Be it known that I, BENONI COLVIN, of Freeport, in the county of Stephenson and State of Illinois, have invented certain new and useful Improvements in Barrel-Trucks, &c.; and I do hereby declare that the following is a full, clear, and exact description of the construction and operation of the same, reference being had to the annexed drawings, making a part of this specification, and to the letters and figures of reference marked thereon.

Figure 1 of the drawings is a side elevation of my truck, showing a barrel thereon, and Fig. 2 is a plan view of the said truck.

My invention relates to means for raising and holding barrels, boxes, bales, and other like articles upon hand-trucks; and it consists in the combination of a truck with a grappling-hook, a hand-crank, and a pawl and ratchet, substantially in the manner and for the purposes hereinafter fully described, and particularly pointed out in the claim.

In the drawings, A A designate the side bars of a truck-frame, and B B the truck-handles, which are curved extensions of the side bars, A. These side bars are held firmly together by cross-bars C, and the frame thus formed is supported by the wheels D D.

The grappling-hook E is formed with short prongs or teeth $e$ at its curved end, so that when a barrel is grappled thereby the hook will not slip. At its straight end the hook is hinged to a crank or lever arm, $f$, upon the rod F, which has its ends journaled in the side bars of the truck-frame at a point above where the bars commence to curve upward to form the handles. Upon the rod F is secured a ratchet, G, and to the side bar adjacent to this ratchet is a pawl, G', which engages with the ratchet. To one of the ends of the rod F is secured a handle, H, whereby the rod can be turned in order to move the hook forward or backward.

In placing a barrel upon the truck the truck is raised by the handles and its forward end pushed under the barrel. The operator then grapples the barrel with the hook, and by tilting the forward end of the truck the barrel will be held upon the truck. To now draw it well on the truck the operator turns the crank-handle of the rod F, which will turn the said rod, and hence draw the grappling-hook back, which movement brings the barrel farther back on the truck. When the barrel is in proper position the operator releases the handle, and the pawl engaging with the ratchet holds the ratchet and rod against turning, and therefore prevents the forward movement of the hook and the consequent rolling of the barrel from off the truck.

It is evident that the rod F may be bent so as to form a hand-lever between the sides of the truck, in which case the hand-lever at the side may be dispensed with. This last-mentioned construction will be found advantageous where it is necessary to carry the truck through narrow passages or doors.

What I claim, and desire to secure by Letters Patent, is—

The combination of a hand-truck with a grappling-hook hinged to a crank or arm of the rotary rod F, a pawl and ratchet for holding said rod against turning, and a handle for turning said rod and actuating the grappling-hook, substantially as specified.

In testimony that I claim the above I have hereunto subscribed my name in the presence of two witnesses.

BENONI COLVIN.

Witnesses:
 A. T. GREEN,
 H. C. HYDE.